US009295072B2

(12) United States Patent
Mintz et al.

(10) Patent No.: US 9,295,072 B2
(45) Date of Patent: Mar. 22, 2016

(54) SYSTEM AND METHODS FOR USING COMMUNICATION RESOURCES

(71) Applicant: Raytheon Company, Waltham, MA (US)

(72) Inventors: Nathan M. Mintz, Redondo Beach, CA (US); Jamil R. Hashimi, Hermosa Beach, CA (US); Russell W. Lai, Rancho Palos Verdes, CA (US); Hung Q. Nguyen, Huntington Beach, CA (US); Gregory S. Vogt, Torrance, CA (US); Gordon R. Scott, Farmersville, TX (US); Retting D. Ryan, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 288 days.

(21) Appl. No.: 14/015,244

(22) Filed: Aug. 30, 2013

(65) Prior Publication Data
US 2015/0305053 A1     Oct. 22, 2015

(51) Int. Cl.
*H04W 72/00* (2009.01)
*H04W 72/10* (2009.01)
(52) U.S. Cl.
CPC .................................... *H04W 72/10* (2013.01)
(58) Field of Classification Search
CPC ............................. H04W 88/02; H04N 19/33
USPC ............ 455/450, 562.1, 454, 522, 453, 63.4, 455/452.1, 41.2, 452.2, 420; 370/451, 329, 370/335
See application file for complete search history.

(56) References Cited

U.S. PATENT DOCUMENTS

| | | | |
|---|---|---|---|
| 5,539,409 A * | 7/1996 | Mathews et al. ............ 342/26 B |
| 8,203,942 B2 | 6/2012 | Hernandez et al. | |
| 2006/0010443 A1 | 1/2006 | Lahti | |
| 2008/0181252 A1* | 7/2008 | Rofougaran .................. 370/451 |
| 2010/0008331 A1* | 1/2010 | Li et al. ....................... 370/335 |
| 2010/0318322 A1 | 12/2010 | Brauer et al. | |
| 2011/0067032 A1 | 3/2011 | Daly | |
| 2013/0300605 A1* | 11/2013 | Celentano et al. ............ 342/372 |

* cited by examiner

*Primary Examiner* — Kiet Doan
(74) *Attorney, Agent, or Firm* — Schwegman Lundberg & Woessner, P.A.

(57) ABSTRACT

Embodiments of a system and method for using radio frequency (RF) resources are generally described herein. In some embodiments, the system includes an antenna subsystem including antenna apertures. The system may also include devices configured to execute a plurality RF tasks. The system may further include memory to store a prioritized list of RF tasks. The system may still further include a manager to receive a request from an RF task to use an antenna aperture. The manager may insert the RF task into a prioritized list of RF tasks within a time duration specified in the request. The manager may spawn a thread to execute the RF task through the antenna aperture, within a time frame depending on the RF task's position in the prioritized list.

15 Claims, 3 Drawing Sheets

SYSTEM AND METHODS FOR USING COMMUNICATION RESOURCES

TECHNICAL FIELD

Embodiments pertain to allocating communication resources in a multi-function architecture. Some embodiments relate to providing communication resources through a centralized system across an electronic warfare battle area.

BACKGROUND

Current electronic warfare systems often use a mission computer that ties together the functionality of multiple single-function systems. Current mission computers may fulfill the needs for antenna aperture and radio frequency (RF) spectrum access of one system by interfering with or preventing access to these communication resources by other systems. This may cause deteriorating performance leading to relatively slow response times and possible security problems on the electronic warfare battlefield. Thus, there are general needs for improved systems and methods for allocating RF resources in electronic warfare systems.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current electronic warfare (EW) systems have focused on single-function systems to perform various EW tasks, such as target acquisition and identification, target position determination, and fire control solutions. Current systems may tie these tasks together with a mission computer. To manage resources, current mission computers may use blanking lines for communication resource management by fulfilling the needs for antenna aperture or spectrum access of one function by interfering with such access by other systems. This may cause starvation of some systems. Such starvation may affect situational awareness or interoperability, or increase target vulnerability on the EW battlefield. For example, targets may not be identified quickly enough, leading to threats caused by that target not being countered, and putting assets at risk from such targets.

Some embodiments may address these and other concerns by enabling a system to operate across the EW battlefield to perform electronic attack, electronic support, communications, and intelligence tasks using multiple networked devices, computers, or sensors while reducing or eliminating inter-function (or co-site) interference. Some embodiments provide a multi-function resource-managed radio frequency (RF) system architecture.

The multi-function resource-managed RF system architecture of some embodiments may use a multi-tiered approach with at least two tiers of resource management to execute an arbitrary number of tasks within the same system. In this regard, some embodiments manage communication resources so that multiple back end tasks (e.g., communication reception tasks and electronic support tasks) may have communication needs satisfied by a single front end resource, for example a single antenna aperture resource. Some embodiments may balance tasks with variable latency needs and priority levels without the use of blanking lines. Instead, some embodiments use a greedy fill algorithm to make use of the same resources while minimizing inter-task interference. The greedy fill algorithm may be implemented to assign tasks in decreasing order of priority, and allocate only an amount of resources, for example antenna apertures or other communication resources, needed to meet performance requirements for each task. The greedy fill algorithm may be adaptable to reconfigure allocations to meet changing needs or situations on the EW battlefield.

Figure 1:
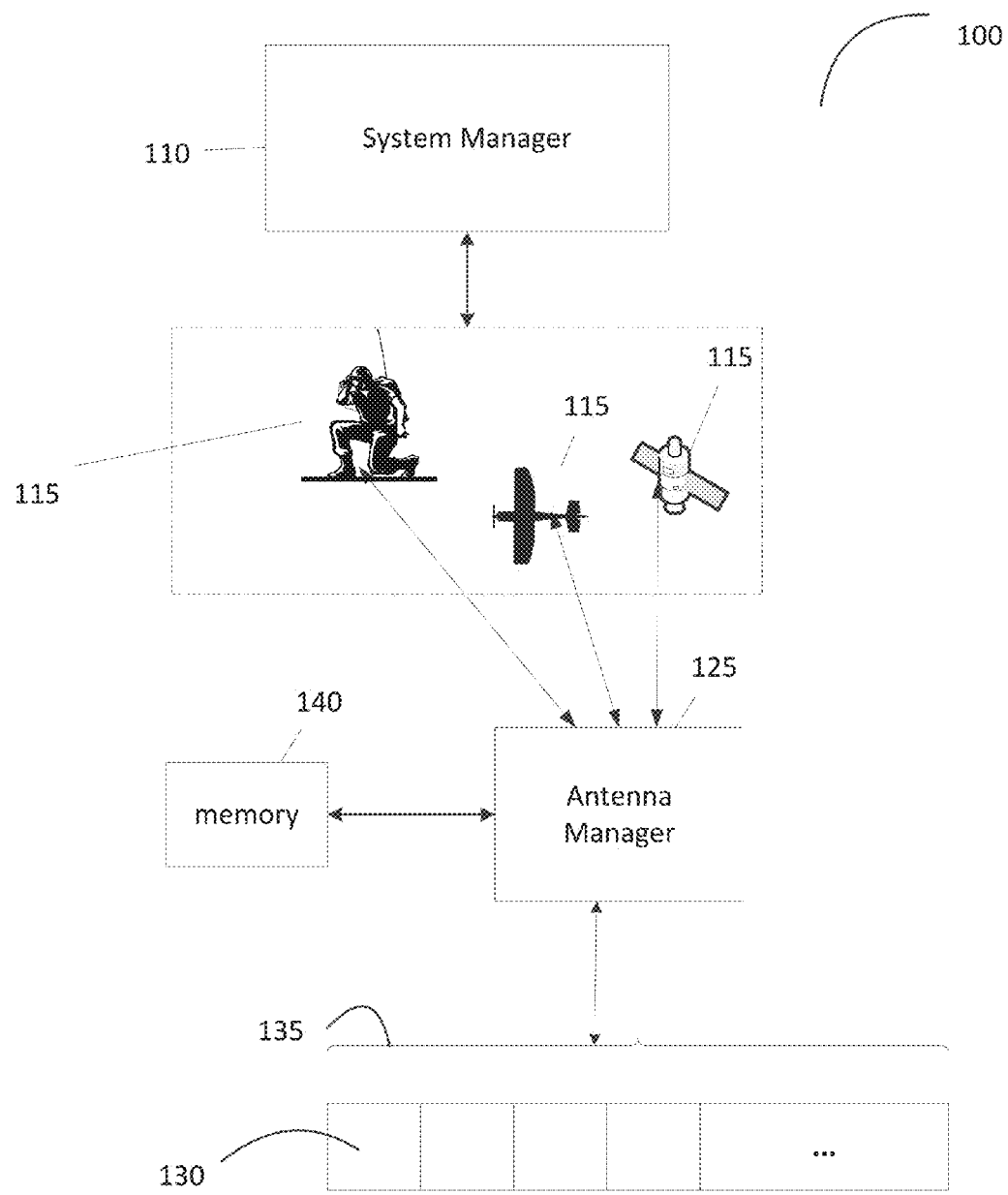
FIG. 1 is a functional diagram of a system in accordance with some embodiments.

FIG. 1 is a functional diagram of a system 100 in accordance with some embodiments. The system 100 includes a system manager 110. The system manager 110 may communicate statuses or other information to other computers for display to an automated agent or to a human agent, for example a technician or intelligence officer (not shown in FIG. 1).

The system 100 includes devices 115 to execute a plurality of RF tasks. The system manager 110 may receive status information or other information from devices 115. Devices 115 may be, or may attach to, for example, air assets, ground assets, computer systems, human assets, or other devices or systems. RF tasks associated with the devices 115 may include, e.g., self-protection tasks, tactical signal intelligence tasks, electronic attack tasks, communication tasks, networked mission tasks, etc. The system manager 110 may provide high-level prioritization of the RF tasks. The system 100 may include an antenna manager 125 to adjust, reorder, or assign to RF communication resources as described below. The system manager 110 may assign RF tasks to devices 115 that the devices 115 may complete or fulfill upon being allocated RF communication resources as described in more detail below.

The system 100 includes an antenna subsystem 135 with a plurality of antenna apertures 130. The antenna manager 125 may receive a request from an RF task of a device 115 to use one of the antenna apertures 130 of the antenna subsystem 135. The RF task may also request use of other RF resources such as, for example, RF signal processors, transceiver hardware, etc. The antenna manager 125 may be independent of the antenna subsystem 135. A memory 140, which may reside separately or within one or more antenna managers 125, stores a prioritized list of RF tasks.

The system 100 includes a memory 140 to store a prioritized list of RF tasks. The antenna manager 125 inserts the RF task into the prioritized list of RF tasks stored in the memory 140, within a time duration specified in the request. The antenna manager 125 accesses the prioritized list of RF tasks to determine a priority level of the RF task that is requesting usage of antenna apertures 130 or other RF resources.

The priority level may be of a reflective level for software-based RF tasks. Reflective tasks may react to environmental changes over periods of time. RF tasks of the reflective priority level may require human intervention or decision making to provide high-level synthesis of information, for example changing of mission priorities based on environmental changes. RF tasks of the reflective priority level may cause or lead to relatively longer latencies to reprogram the system 100. This reprogramming may include, for example, re-sorting the prioritized list of RF tasks, reloading software, or reimaging FPGAs. RF tasks at the reflective priority level may request that the antenna manager 125 respond with a resource allocation or other response within around 10 milliseconds.

The priority level may be of a reactive level for RF tasks that require a faster response time than is permitted by the reflective level. RF tasks of the reactive priority level may require antenna manager 125 action in real-time, or around 500 microseconds.

Finally, the priority level may be of a reflexive level for hardware-based RF tasks that have a faster response requirement than is permitted by the reactive level. RF tasks of the reflexive priority level may require a mechanical response with little or no choice or intervention possible or required, within about 50 nanoseconds. For example, RF tasks of the reflexive level may adjust an electronic attack technique to account for changing threat characteristics such as frequency hopping or mode changes, or changing communication frequencies when the appropriate device 115 detects that a communication frequency is being jammed. Servicing of reflexive RF tasks may cause the system 100 to perform real-time or "smart" blanking, for example, by inhibiting the function of other RF tasks through at least one aperture 130.

Once the antenna manager 125 has identified and allocated an antenna aperture 130 or other resource, the antenna manager 125 spawns a thread, within a response time of the request based on the priority level of the RF task and the position of the RF task in the prioritized list. The thread executes the RF task through the antenna aperture 130. The antenna manager 125 may spawn the thread such that the thread executes for a certain number of time slices. The antenna manager 125 may spawn the thread subsequently to having spawned threads for other RF tasks that were previous in order to the RF task in the prioritized list. For example, the antenna manager 125 may allocate antenna apertures 130 and spawn threads for RF tasks in an order beginning at the top of the prioritized list. However, the antenna manager 125 may ensure that it spawns threads within response time requirements pertinent to the given priority level for each RF task, discussed above. For some RF tasks with a reflexive priority level, the antenna manager 125 may suppress execution of all other RF tasks through at least one antenna aperture 130 to allow that reflexive-level RF task full access to at least one antenna aperture 130.

The system manager 110 or the antenna manager 125 may dynamically order or re-order the prioritized task list. The response time for changes in the task list may be within the range of 5-300 milliseconds.

The antenna manager 125 may receive an indication that an RF task no longer requires at least one of the time slices that the antenna manager 125 originally allotted for the spawned thread for that RF task. In at least this situation, the antenna manager 125 may reallocate one or more of these time slices to other RF tasks, or use one or more of these time slices to allocate to other RF tasks.

While FIG. 1 illustrates one system manager 110, one antenna manager 125, and a few devices 115, the system 100 may include several system managers 110, antenna managers 125, or devices 115. System managers 110, antenna managers 125, or devices 115 may enter or exit the system 100 at any time. Functionality of the system manager 110 or antenna manager 125 may also be split among several system managers 110 or antenna managers 125. For example, one or more portions of the antenna manager 125 may receive requests from RF tasks. A separate portion or portions of the antenna manager 125 may schedule these tasks by spawning threads and executing the threads in parallel with other threads through an antenna aperture 130. Further, a computing device 115 that implements an RF task may act as an antenna manager 125 or an RF communication resource in at least some aspects. For example, a computing device 115 may act as an antenna manager 125 to manage an antenna aperture 130 connected to or associated with the computing device 115.

Figure 2:
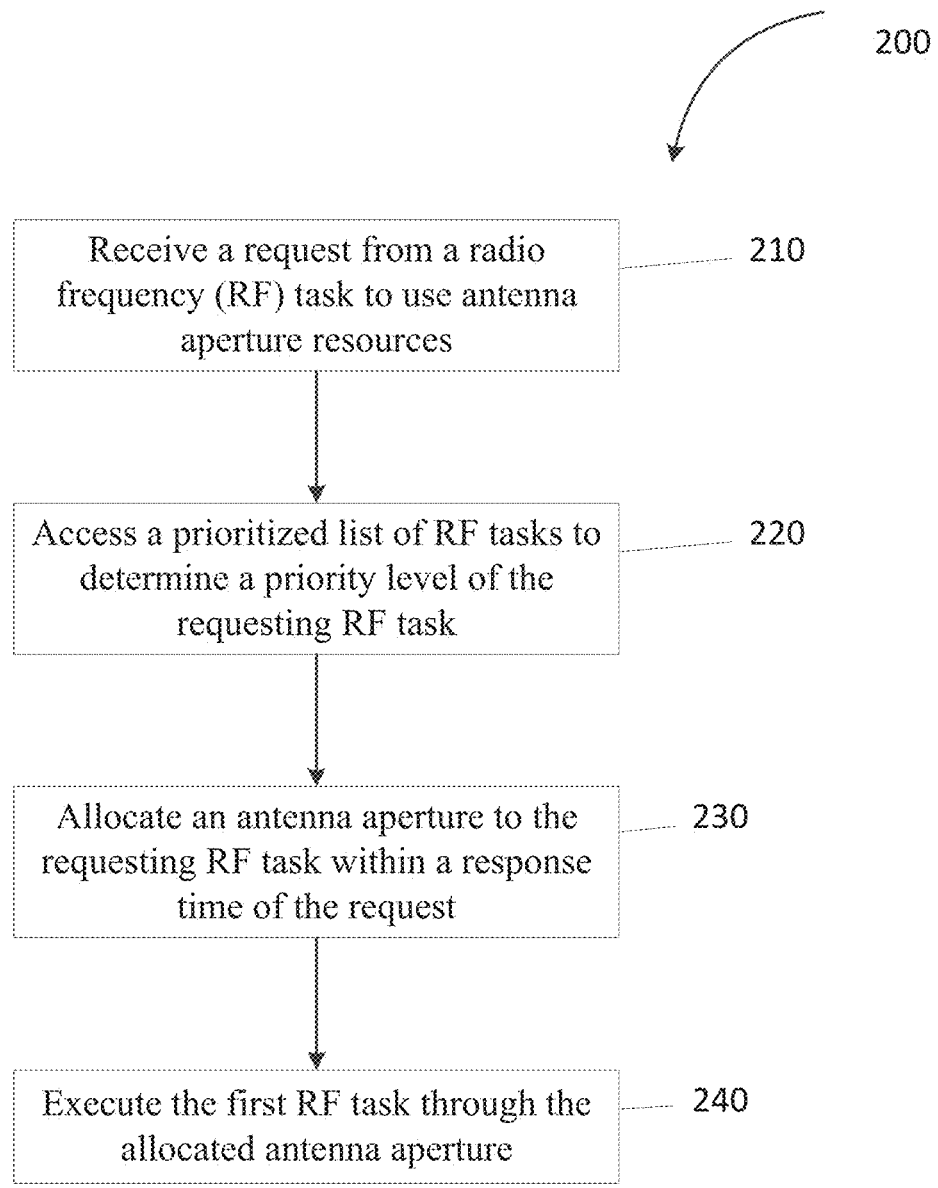
FIG. 2 is a flow chart of a procedure for using communication resources.

FIG. 2 is a flow chart of a procedure 200 for using communication resources. One or more managers, for example the system manager 110 (FIG. 1) or the antenna manager 125 (FIG. 1), may perform some or all of the procedure 200.

In operation 210, the antenna manager 125 may receive a request from a radio frequency (RF) task to use antenna aperture 130 resources.

In operation 220, the antenna manager 125 may access a prioritized list of RF tasks to determine a priority level of the requesting RF task. The list may be accessed from the memory 140 (FIG. 1).

In operation 230, the antenna manager 125 may allocate an antenna aperture 130 to the requesting RF task within a response time of the request. The response time may be based on the priority level of the requesting RF task as described above with respect to FIG. 1. The antenna manager 125 may then proceed through the prioritized list to allocate time slices of the antenna aperture 130 or other antenna apertures 130 of the antenna subsystem 135 to other RF tasks. The antenna manager 125 may proceed in order through the prioritized list to allocate, in decreasing order of priority, minimum antenna aperture 130 resources and other resources required to meet the needs of the RF tasks until resources are depleted.

In operation 240, the antenna manager 125 may execute the RF task through the allocated antenna aperture 130. As described above with respect to FIG. 1, executing the RF task may include spawning a thread to execute the RF task and executing the thread in parallel, for a time duration including time slices, with other threads of other RF tasks to which the antenna aperture 130 resource is allocated.

As described above, one or more of these operations of the procedure 200 may be performed by different portions or devices that implement functionality of the antenna manager 125, and one or more of these operations may be performed by devices or assets 115 or the system manager 110 (FIG. 1). This partitioning permits the introduction of new capabilities without software redesign. In particular, this decouples the RF subsystems from any centralized mission computer. As also described above, the procedure 200 may include receiving an indication that the RF task no longer requires a time slice of the time duration for execution, and reallocating the time slice to another RF task of the list of RF tasks.

Figure 3:
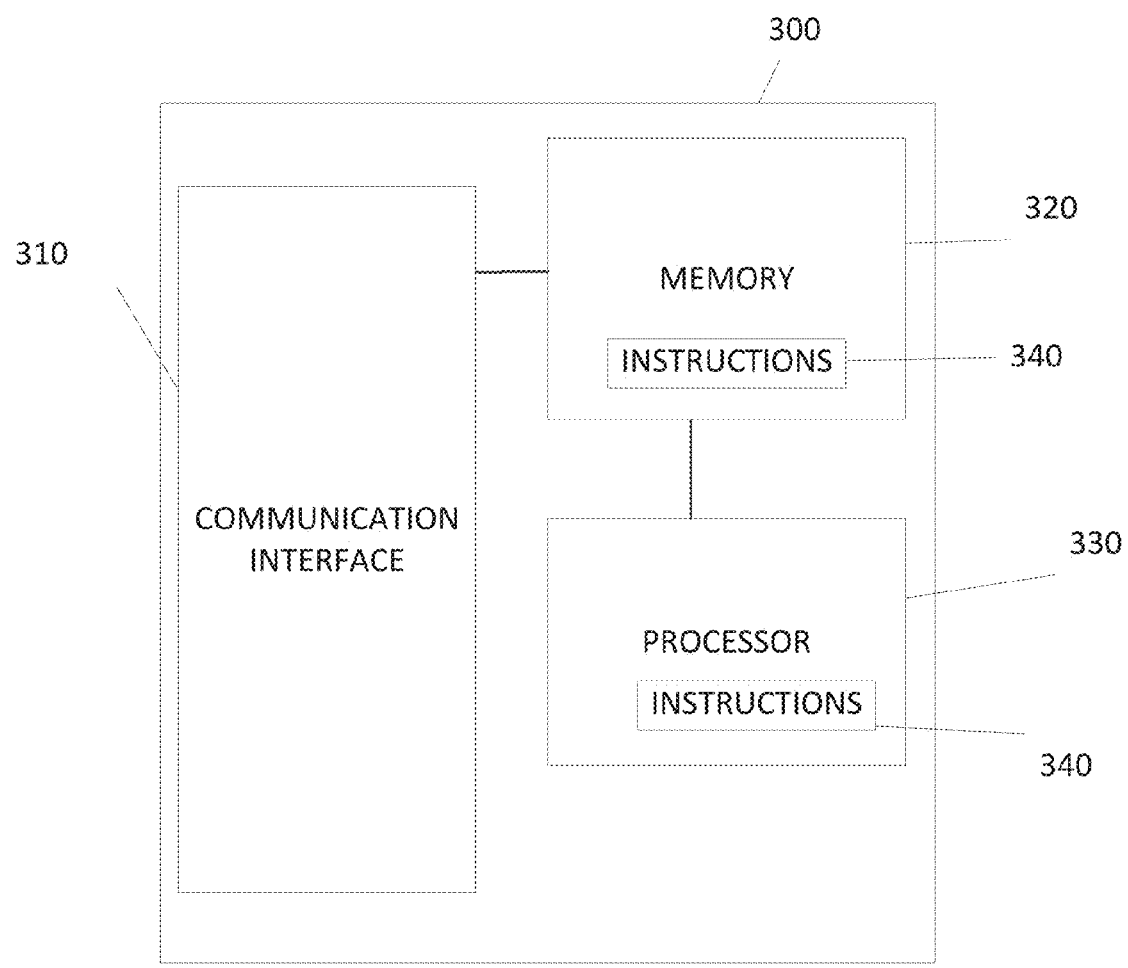
FIG. 3 is a block diagram of a computer for implementing methods according to example embodiments.

FIG. 3 is a block diagram of a computer 300 for implementing methods according to example embodiments. The computer 300 may be appropriate for performing the functionalities of an antenna manager 125 (FIG. 1). The computer 300 may be appropriate for accessing a prioritized list of RF tasks and assigning each task, in order, the amount or number of communication resources needed by each RF task to complete or fulfill that RF task's functionality.

The computer 300 may include a communication interface 310. The communication interface 310 may be arranged to communicate over a network with other antenna managers 125 or devices 115 of the system 100 (FIG. 1) or with a system manager 110.

The computer 300 may include a memory 320. In one embodiment, memory 320 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The computer 300 may include a processor 330.

Embodiments may also be implemented as instructions 340 stored on a computer-readable storage device, which may be read and executed by at least one processor 330 to perform the operations described herein. For example, the instructions 340 may cause the computer 300 to receive a request from a first radio frequency (RF) task to use antenna aperture 130 (FIG. 1) resources. The instructions 340 may cause the computer 300 to insert the first RF task into a prioritized list of RF tasks within a time duration specified in the request. The instructions 340 may cause the computer 300 to allocate an antenna aperture 130 to the first RF task within a response time of the request, the response time being based on a priority level of the first RF task. Further, the instructions 340 may cause the computer 300 to execute the first RF task through the antenna aperture 130.

In some embodiments, the instructions 340 are stored on the processor 330 or the memory 320 such that the processor 330 and the memory 320 act as computer-readable mediums. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. For example, the program code may execute, in whole or in part, on any antenna manager 125, system manager 110, or device 115 of the system 100 described above with respect to FIG. 1.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of using communication resources, the method comprising:
   receiving a request from a first radio frequency (RF) task to use antenna aperture resources;
   accessing a prioritized list of RF tasks to determine a priority level of the requesting first RF task;
   allocating an antenna aperture to the first RF task within a response time of the request, the response time being based on the priority level of the first RF task;
   executing the first RF task through the allocated antenna aperture by:
      spawning a thread to execute the first RF task; and
      executing the thread in parallel, for a time duration including time slices, with other threads of other RF tasks to which the antenna aperture resource is allocated; and
   allocating time slices of the antenna aperture or another antenna aperture to another RF task that is lower in priority than the first RF task based on an inspection of the list of RF tasks.

2. The method of claim 1, further comprising:
   receiving an indication that the first RF task no longer requires a time slice of the time duration for execution; and
   reallocating the time slice to another RF task of the list of RF tasks.

3. The method of claim 1, wherein the priority level is one of a reflective level for RF tasks that have a first response requirement, a reactive level for RF tasks that have a second response requirement that is faster than the first response requirement, and a reflexive level for a third response requirement that is faster than the second response requirement.

4. The method of claim 3, wherein the reflective level is for RF tasks that are implemented only with software, and the reflexive level is for RF tasks that are implemented only with hardware.

5. The method of claim 4, further comprising:
   suppressing execution of other RF tasks upon receiving a request from an RF task with a reflexive priority level.

6. The method of claim 3, further comprising:
   inserting the first RF task into the list, and wherein a maximum amount of time to be taken for inserting the first RF task in the list is specified in the request for antenna aperture resources.

7. The method of claim 6, further comprising:
   removing an RF task from the list; and
   reordering the list.

8. The method of claim 1, further comprising:
   allocating a signal processing resource associated with the antenna aperture.

9. A non-transitory computer-readable medium comprising instructions that, when executed on a machine, cause the machine to:
   receive a request from a first radio frequency (RF) task to use antenna aperture resources;
   insert the first RF task into a prioritized list of RF tasks within a time duration specified in the request;
   allocate an antenna aperture to the first RF task within a response time of the request, the response time being based on a priority level of the first RF task;
   execute the first RF task through the antenna aperture, by spawning a thread to execute the first RF task, based on a position of the first RF task in the prioritized list of RF tasks and subsequent to having spawned threads for other RF tasks previous in order to the first RF task in the prioritized list of RF tasks; and executing the thread, for a time duration including a plurality of time slices, through the antenna aperture and in parallel with other threads executing through the antenna aperture;
   receive an indication that the first RF task no longer requires a time slice of the time duration for execution; and
   reallocate the time slice to a thread executing another RF task of the list of RF tasks.

10. The non-transitory computer-readable medium of claim 9, wherein the priority level is one of a reflective level for software-implemented RF tasks that have a first response requirement, a reactive level for RF tasks that have a second response requirement that is faster than the first response requirement, and a reflexive level for a third response requirement that is faster than the second response requirement.

11. The non-transitory computer-readable medium of claim 10, further comprising instructions that, when executed on a machine, cause the machine to:

upon receiving a request from an RF task with a reflexive priority level, suppress execution of threads of other RF tasks.

12. A system comprising:

an antenna subsystem including a plurality of antenna apertures;

memory configured to store a prioritized list of RF tasks; and a manager configured to receive a request, from a first RF task of the plurality of RF tasks, to use an antenna aperture of the plurality of antenna apertures, insert the first RF task into a prioritized list of RF tasks within a time duration specified in the request, access the prioritized list of RF tasks to determine a priority level of the first RF task, spawn a thread, within a response time of the request based on a position of the first RF task in the prioritized list, to execute the first RF task through an antenna aperture of the plurality of antenna apertures for a number of time slices, receive an indication that the first RF task no longer requires a time slice of the number of time slices for execution; and reallocate the time slice to another RF task of the list of RF tasks.

13. The system of claim 12, wherein the manager is configured to:

spawn the thread subsequent to having spawned threads for other RF tasks previous in order to the first RF task in the prioritized list of RF tasks.

14. The system of claim 12, wherein the priority level is one of a reflective level for software-based RF tasks that have a first response requirement, a reactive level for RF tasks that have a second response requirement that is faster than the first response requirement, and a reflexive level for hardware-based RF tasks that have a third response requirement that is faster than the second response requirement; and the manager suppresses execution of all other RF tasks through at least one antenna aperture upon receiving a request from an RF task with a reflexive priority level.

15. The system of claim 12, further comprising:

signal processing resources and transceiver resources, and wherein the manager is further configured to allocate a signal processing resource or a transceiver resource to be used by the requesting RF task in conjunction with the allocated antenna aperture.

* * * * *